Patented Sept. 27, 1949

2,482,844

UNITED STATES PATENT OFFICE 2,482,844

CELLULOSE ETHER MANUFACTURE

Alexander S. Finlayson, Rahway, N. J., assignor to Hercules Powder Company, Wilmington, Del., a corporation of Delaware No Drawing. Application October 6, 1945, Serial No. 620,845

7 Claims. (Cl. 260—331)

This invention relates to improvements in the manufacture of cellulose ethers and, more particularly, to the reduction in etherification cycle time.

Cellulose ethers are prepared by a variety of methods, most of which comprise heating cellulose in an alkaline medium with an etherifying agent. Variations of this method may include the use of comparatively large excesses of alkali or of the etherifying agents, multistage addition of reactants, bleaches, etc.

The manufacturing conditions for cellulose ethers are always limited by the sensitivity to degrading influences of cellulose and cellulose ethers, especially when they are in an alkaline environment. For example, the temperature of etherification must be below that at which substantial decomposition will occur. Due to the limitations placed upon the reaction conditions, the etherification cycle is necessarily an extended one, causing low through-put for a given set of apparatus and thereby raising product costs. In addition, long reaction time promotes corrosion of equipment and leads thereby to pickup of undesired impurities. Numerous variations in plant procedure have been investigated, but, in the great majority of cases, these cause a reduction in product quality or do not result in any appreciable reduction in cycle time.

Now in accordance with this invention, it has been found that the addition of a preformed cellulose ether to a cellulose etherification mixture causes an entirely unexpected any very substantial reduction in etherification cycle time. In order to obtain this increased rate of etherification, between 3% and 15% preformed cellulose ether, based on the cellulose present in the etherification mixture, must be added. Preferably, the preformed cellulose ether is added during the period when the various components of the etherification mixture are being introduced into the etherification vessel.

As illustrations of the method in accordance with this invention, the following examples are cited:

Example 1

One part by weight of an ethyl cellulose having a viscosity of 453,600 cps. and an ethoxyl of 45.8 was mixed with 16 parts by weight of cotton linters and 180 parts by weight of 50% sodium hydroxide. The resulting mixture was transferred to a high-pressure autoclave. After 64 parts by weight of ethyl chloride had been added to the autoclave, the reaction mixture was gradually heated from 65° C. to a maximum reaction temperature of 150° C. Subsequently, the temperature was allowed to recede to 65° C., the total time the reaction mixture was above 65° C. being 17.5 hours.

The ethyl cellulose so formed was then precipitated from the reaction mixture by distilling out the residual ethyl chloride, by-product ether, and by-product alcohol formed by the reaction. After precipitation, the product was washed with water to remove the excess alkali and the sodium chloride formed in the reaction. The product, after drying, was found to have satisfactory stability and solubility in organic solvents. Its viscosity and ethoxyl are given in the table below.

Example 2

Two parts by weight of an ethyl cellulose having 808 cps. viscosity and 47.7 ethoxyl were mixed with 16 parts by weight of cotton linters and 180 parts by weight of 50% sodium hydroxide solution. After 64 parts by weight of ethyl chloride had been added to the autoclave, the etherification was initiated at 65° C. The temperature was allowed to reach a maximum of 150° C., after which the reaction mass was cooled. The temperature was above 65° C. for a total of 17 hours. The isolation and purification steps were identical with those shown in Example 1, and the products from Examples 1 and 2 were very similar. Viscosity and ethoxyl of the product are given in the table below.

Example 3

For comparison with Examples 1 and 2, a similar ethylation was made in the absence of a preformed ethyl cellulose: Sixteen parts by weight of cotton linters were mixed with 180 parts by weight of 50% sodium hydroxide solution. The resulting mixture was transferred to a high-pressure autoclave. When 64 parts by weight of ethyl chloride had been added to the autoclave the reaction mixture was heated to 65° C. to initiate etherification. The temperature was then gradually raised to a maximum of 150° C., followed by cooling to 65° C. The total time of etherification was 20 hours. The isolation and purification steps were identical with those used in Examples 1 and 2. The product was substantially identical with those formed in the above examples. Viscosity and ethoxyl of the product are given in the table below. The etherification time in each case was that required to attain an ethoxyl content of about 47.1%.

The table presents a comparison between the ethyl celluloses made in the presence of preformed ethyl cellulose according to Examples 1 and 2 and the ethyl cellulose made in the absence of preformed ethyl cellulose (Example 3), together with etherification times for each product.

Table

| Product | Per Cent Preformed Ethyl [1] Cellulose | Etherification Time | Ethoxyl | Viscosity |
| --- | --- | --- | --- | --- |
| | | Hours | Percent | Cps. |
| From Example 1 | 6.25 | 17.5 | 47.1 | 29.8 |
| From Example 2 | 12.5 | 17.0 | 47.2 | 32.6 |
| From Example 3 | 0 | 20.0 | 47.0 | 31.0 |

[1] Based on the weight of the cotton linters.

As shown by the table, preformed cellulose ethers may be advantageously added to the etherification reaction mass for the express purpose of reducing the etherification time which is necessary to reach a given viscosity and degree of substitution, regardless of the viscosity or substitution of said preformed ether.

Usually, the preformed ethers which are added to the reaction mass vary in viscosity from about 10 cps. to about 1000 cps. but may, as shown by Example 1, have viscosities as high as about 500,000 cps. Also, the degree of substitution of the preformed ethyl cellulose may be between about 10 and 52% and may vary appreciably from that of the desired final product and still be useful in effecting a substantial reduction in etherification time. Furthermore, according to this same example and the table, the substitution of the preformed ether is apparently adjusted during the etherification so that the substitution of final product is not detrimentally or appreciably affected by the original substitution of the preformed ether. By preference, a lower substituted preformed ether is added than is desired in the final product.

The preformed ether may be present in any amount from 3% to 15%, based on the weight of the cellulose. As shown by the table, 6.25% and 12.5% of preformed cellulose ether caused a reduction of 11.5% and 15%, respectively, in the etherification time of Examples 1 and 2 over that of Example 3. It has been found that from 3% to 15% preformed ether based on the weight of the cellulose is highly effective in causing reduction in cycle time. By such an addition, the rate of etherification may be increased as much as about 17%. Below 3% preformed cellulose ether, the increase in the speed of etherification is substantially reduced, while, above 15% of the ether, no additional increase in etherification rate occurs. Since amounts between about 6% and about 10% may be used for the purpose of obtaining the optimum increase in the rate of etherification, this is the preferred range for utilizing the present invention.

According to Examples 1 and 2, the preformed cellulose ether was added to the cotton linters prior to the addition of the etherification reagents. However, the order of addition of the components of the reaction mass is immaterial to the accomplishment of the present invention. Hence, alkali cellulose may be formed before addition of the preformed cellulose ether; or the etherifying agent may be added to cellulose or to alkali cellulose before the addition of said ether. The reagents may be added stepwise, the preformed cellulose ether being added with or between the reagent additions. Other similar variations will not adversely modify the effects of the present invention.

While the examples have shown the use of cotton linters as the cellulose used in the etherification process, other materials such as wood pulp and the cellulosic grasses, such as ramie and flax, may be employed. Likewise, the preformed cellulose ether may be formed from any cellulosic base such as cotton linters, wood pulp, or the cellulosic grasses.

While the invention has been illustrated by a typical procedure for the formation of ethyl cellulose, the invention is operable with other means of forming ethyl cellulose. Furthermore, the present invention may be utilized in the formation of other cellulose ethers. For example, alkyl ethers, such as methyl cellulose, propyl cellulose and butyl cellulose; aralkyl ethers, such as benzyl cellulose; alkylene ethers, such as allyl cellulose; or carboxyalkyl ethers, such as carboxymethylcellulose, may be made by methods incorporating the invention.

In order to simplify purification problems, the preformed cellulose ether should be the same ether which is to be made in the etherification mixture to which it is added. However, for some purposes, this is not necessary, and the indentity of the preformed cellulose ether would be immaterial.

The etherifying agent used may be an organic halide, such as the ethyl chloride shown in the examples; an organic sulfate, such as dimethyl sulfate; or a halogenated organic acid, such as chloracetic acid. Other specific etherifying agents are methyl chloride, benzyl chloride, ethyl bromide, butyl chloride, propyl bromide, and allyl chloride. Preferably, the alkylating agent used will be an alkyl chloride.

Instead of the 10:1 molecular ratio of ethyl chloride to cellulose which is shown in the examples, other ratios ranging within wide limits may be used. In preparing cellulose ethers having a good solubility in organic solvents, a large excess of the etherifying agent is preferred. Hence, the most suitable range is 5:1 to 15:1, but the molecular ratio may at times be higher or lower. While the greatest benefit of this invention is effected in reaction mixtures containing no inert diluent, such diluents as ethers, alcohols or hydrocarbons may be present. The use of diluents tends to lengthen the required etherification time.

When using an alkyl chloride as the etherifying agent, according to the preferred procedure shown in the examples, the reaction is carried out in an autoclave provided with means of agitation. A desired reaction temperature is determined largely by the reactivity and amount of the etherifying agent present. Thus, when using ethyl chloride as the etherifying agent, a temperature within the range of about 65° C. to about 150° C. will be found satisfactory.

Sodium hydroxide is the alkali ordinarily employed in the reaction and, consequently, was used in the examples. However, quaternary ammonium bases or alkali metal hydroxides other than sodium hydroxide also may be employed either singly or in combination. While the examples show the use of a molecular ratio of 1:25 for the proportions of cellulose to sodium hydroxide, the ratio may vary from 1:4 to 1:35, but preferably will be in the range from about 1:16 to 1:28, depending upon the desired substitution of the product. The alkali may be mixed with the cellulose; or with the cellulose and preformed cellulose ether; or with these two components after the addition of the etherifying agent; or may be added in one or several steps either before or during etherification. The concentration of the alkali solution may be adjusted to the other reaction conditions but usually will be between about 30% and about 70%, preferably about 50%. However, solid caustic may be used in addition to solutions having concentrations within this range.

Wherever viscosities are mentioned herein, it will be understood to mean the viscosity, expressed in centipoises, of a 5% solution of the cellulose ether in 80:20 toluene:alcohol at 25° C. By "preformed cellulose ether" is meant a cellulose ether which has been etherified prior to its inclusion in a subsequent cellulose etherification reaction mass.

In summary, if preformed cellulose ethers are added to etherification reaction mixtures in quantities between about 3% and about 15% of the cellulose, the rate of etherification may be unaccountably increased as much as about 17%. Hence, the invention is versatile and useful in operation and result.

What I claim and desire to protect by Letters Patent is:

1. In a process for the preparation of organic-solvent-soluble cellulose ethers, the steps which comprise mixing a preformed cellulose ether with etherification reaction ingredients comprising cellulose, alkali and an etherifying agent, and etherifying said cellulose in the presence of said preformed cellulose ether under conditions of temperature, pressure and agitation to produce an organic-solvent-soluble cellulose ether, said preformed cellulose ether being present in an amount from about 3 to about 15%, based on the weight of said cellulose, and said preformed cellulose ether containing the same substituent ether groups as those introduced into said cellulose by said etherification reaction.

2. A process according to claim 1, wherein the etherifying agent is an alkylating agent.

3. A process according to claim 1, wherein the etherifying agent is an ethylating agent.

4. A process according to claim 1, wherein the etherifying agent is ethyl chloride.

5. In a process for the preparation of organic-solvent-soluble cellulose ethers, the steps which comprise mixing a preformed cellulose ether with etherification reaction ingredients comprising cellulose, sodium hydroxide and ethyl chloride, and etherifying said cellulose in the presence of said preformed cellulose ether under conditions of temperature, pressure and agitation to produce an organic-solvent-soluble cellulose ether, said preformed cellulose ether being present in an amount from about 3 to about 15%, based on the weight of said cellulose, and said preformed cellulose ether containing the same substituent ether groups as those introduced into said cellulose by said etherification reaction.

6. In a process for the preparation of organic-solvent-soluble cellulose ethers, the steps which comprise mixing a preformed cellulose ether with etherification reaction ingredients comprising cellulose, an alkaline medium and an etherifying agent, and etherifying said cellulose in the presence of said preformed cellulose ether under conditions of temperature, pressure and agitation to produce an organic-solvent-soluble cellulose ether, said preformed cellulose ether being present in an amount from about 3 to about 15%, based on the weight of said cellulose, and said preformed cellulose ether containing the same substituent ether groups as those introduced into said cellulose by said etherification reaction.

7. In a process for the preparation of organic-solvent-soluble cellulose ethers, the steps which comprise mixing a preformed cellulose ether with etherification reaction ingredients comprising alkali cellulose and an etherifying agent, and etherifying said alkali cellulose in the presence of said preformed cellulose ether under conditions of temperature, pressure and agitation to produce an organic-solvent-soluble cellulose ether, said preformed cellulose ether being present in an amount from about 3 to about 15%, based on the weight of said cellulose, and said preformed cellulose ether containing the same substituent ether groups as those introduced into said alkali cellulose by said etherification reaction.

ALEXANDER S. FINLAYSON.

REFERENCES CITED

The following references are of record in the file of this patent:

UNITED STATES PATENTS

| Number | Name | Date |
| --- | --- | --- |
| 2,161,815 | Hahn | June 13, 1939 |
| 2,190,450 | Hahn | Feb. 13, 1940 |
| 2,285,514 | Houghton et al. | June 9, 1942 |
| 2,381,972 | Dreyfus | Aug. 14, 1945 |

Certificate of Correction

Patent No. 2,482,844 September 27, 1949

ALEXANDER S. FINLAYSON

It is hereby certified that error appears in the printed specification of the above numbered patent requiring correction as follows:

Column 1, line 33, for the words "any very" read *and very*;

and that the said Letters Patent should be read with this correction therein that the same may conform to the record of the case in the Patent Office.

Signed and sealed this 31st day of January, A. D. 1950.

[SEAL]

THOMAS F. MURPHY,
*Assistant Commissioner of Patents.*